June 24, 1930.  S. B. ATWOOD  1,765,393
COVERED JOINT HINGE
Filed April 30, 1927  2 Sheets-Sheet 1
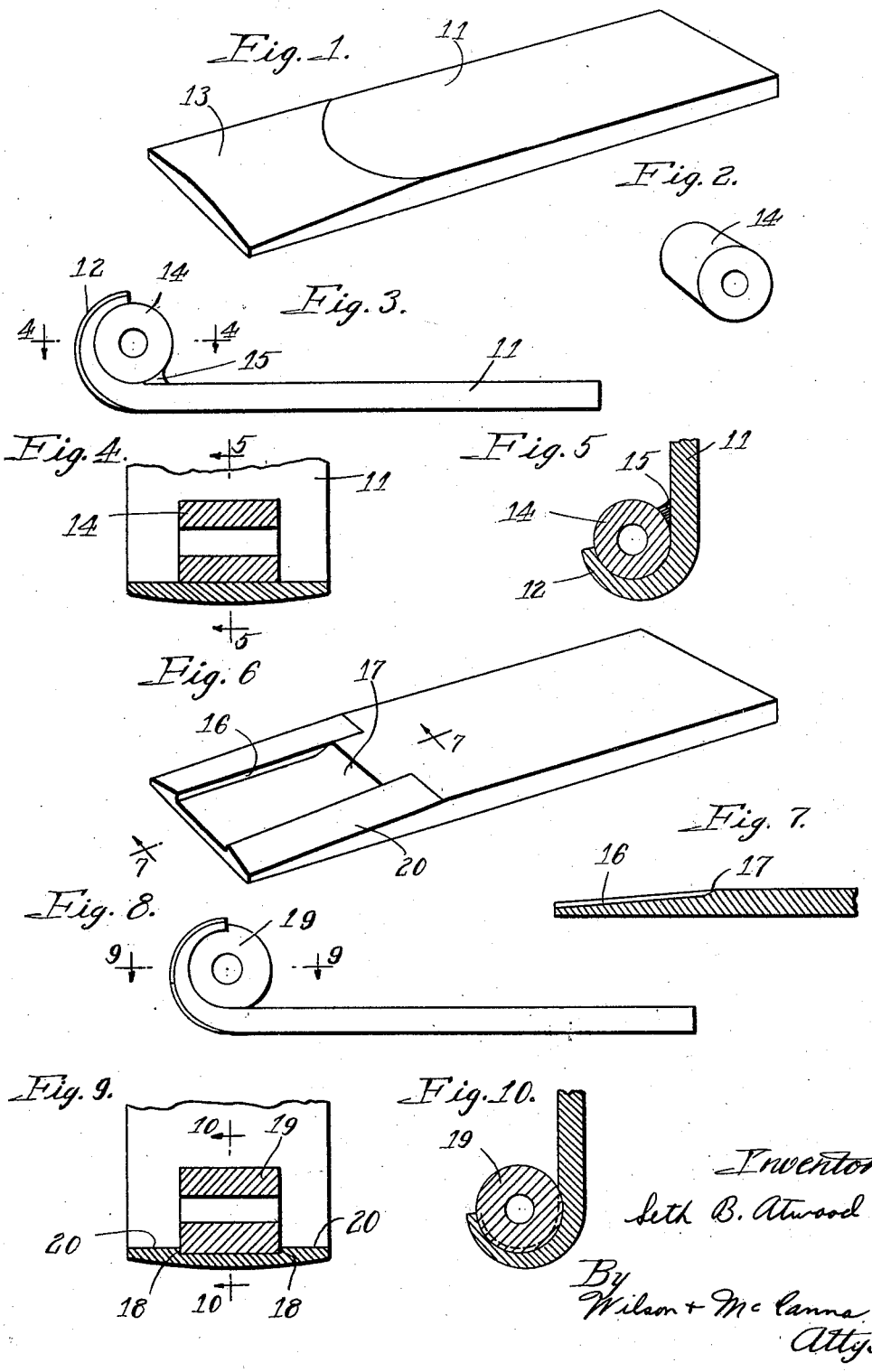

June 24, 1930.  S. B. ATWOOD  1,765,393
COVERED JOINT HINGE
Filed April 30, 1927  2 Sheets-Sheet 2
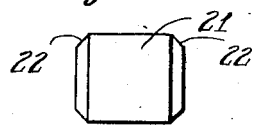
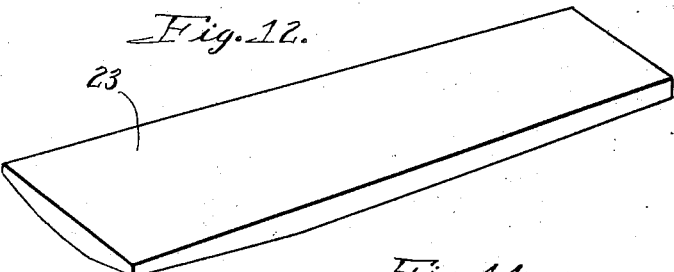
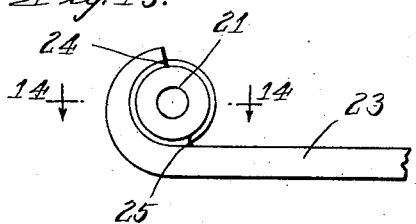
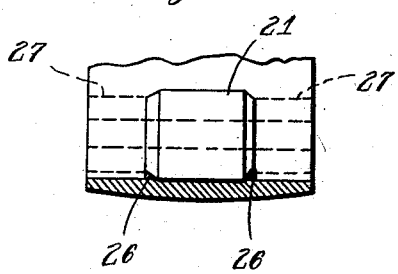
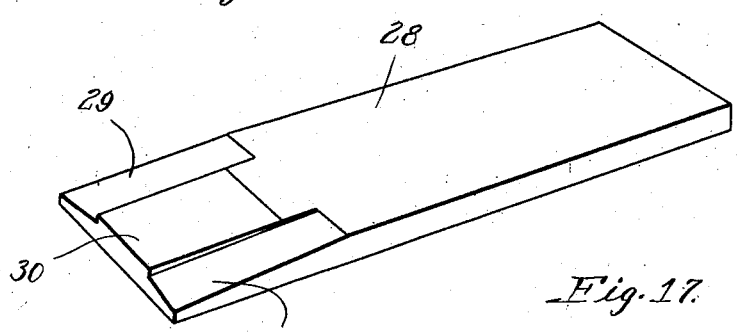
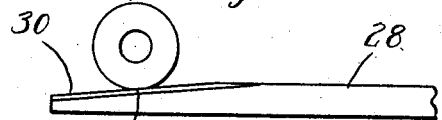
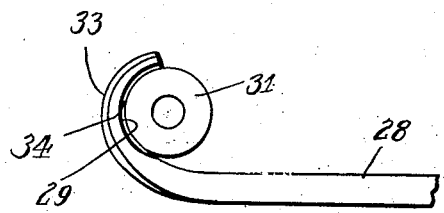
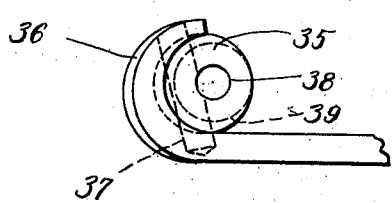
Inventor
Seth B. Atwood
By Wilson & McCanna
Attys.

Patented June 24, 1930

1,765,393

UNITED STATES PATENT OFFICE

SETH B. ATWOOD, OF ROCKFORD, ILLINOIS

COVERED-JOINT HINGE

Application filed April 30, 1927. Serial No. 187,725.

This invention relates to covered joint hinges such as are used in large quantities in the automotive industry for hanging automobile doors. Hinges of this type are characterized by what is known as an inside and an outside hinge member, the latter having a cover portion which conceals and protects the knuckle joint. The making of this outside hinge member has been a problem to manufacturers, especially where the endeavor is to produce a strong and durable hinge at a low cost.

The present invention aims primarily to provide an improved outside member of a covered joint hinge, embodying such principles of construction as to promote economy in the cost of production. This is accomplished, briefly stated, by making the pintle bearing knuckle and the cover portion of the knuckle of separate parts and so combining them that the pintle bearing will be secured in the hollow of the cover portion as will be described more fully hereinafter.

Other objects and attendant advantages will be appreciated as the invention becomes better understood by reference to the following description when considered in connection with the accompanying drawing in which:—

Figure 1 is a perspective view of a sheet metal blank showing one of the first operations;

Fig. 2 is a perspective view of the pintle bearing knuckle part;

Fig. 3 shows these parts assembled;

Fig. 4 is a section taken on the line 4—4 of Fig. 3;

Fig. 5 is a section taken on the line 5—5 of Fig. 4;

Fig. 6 is a perspective view of a blank showing another form of the invention;

Fig. 7 is a section taken on the line 7—7 of Fig. 6;

Fig. 8 shows the latter form, assembled;

Fig. 9 is a section taken on the line 9—9 of Fig. 8;

Fig. 10 is a section taken on the line 10—10 of Fig. 9;

Fig. 11 shows a knuckle part to be used in another form of the invention;

Fig. 12 is a perspective view of a blank to be used with this form of the invention;

Fig. 13 is a side view of this form, assembled;

Fig. 14 is a section taken substantially on the line 14—14 of Fig. 13, showing in dotted lines the location of the end knuckles;

Fig. 15 is a perspective view of a blank made according to another form of the invention;

Fig. 16 is a side view of this blank and knuckle part welded together;

Fig. 17 is a side view of this latter form of the invention after the curling or forming operation; and Fig. 18 is a side view of still another form of the invention.

The present invention relates only to the outside member of a covered joint hinge, that is, to the member which has the cover portion or hood which protects the knuckle joint, and contemplates broadly the provision of a sheet metal blank curved at one end by suitable bending or forming to provide a cover portion and a separate pintle bearing knuckle part or parts secured in the hollow of the cover portion either before or after the bending or forming of the blank. By making the pintle bearing knuckle part separate from the cover portion and making the latter as an integral part of the metal blank which forms the body proper of the hinge member, I have avoided the difficulties inherent in the forming or fashioning of these parts or shapes from a single blank.

In the form of my invention shown in Figs. 1–5 inclusive the body proper of the hinge member is preferably cut from flat bar stock and is referred to herein as a sheet metal blank 11. One end of this blank is curled or otherwise formed to provide a curved cover portion 12 which constitutes a part of the knuckle and also serves as a protecting cover for the knuckle joint. It is preferred that this cover portion shall be of less thickness than the body proper and to this end the blank may be reduced in thickness as shown at 13. This reduction is made by tapering one side of the blank and the taper may either be flat or crowned as shown in Fig. 1. By forming this end of the blank with suitable dies, with the crowned face on the outside, the cover portion will have a crowned finished appearance as shown in Figs. 3 and 4.

The knuckle part is made separate from the hinge body 11 and the cover portion 12, and to this end I have provided a cylindrical part 14, such as shown in Fig. 2, which may be either drilled or left blank before assembling. This knuckle part is adapted to be secured in the hollow of the cover portion 12, in this case centrally thereof as shown in Fig. 4, for use in a three-knuckle hinge. The number and location of these knuckle parts are, however, immaterial to the present invention, since it is obvious that with a five-knuckle hinge more than one knuckle part of this kind would be used. In this form of the invention the knuckle part is inserted in the hollow of the cover portion either during the bending or curling of the latter to its final shape or after the shaping thereof, the knuckle part being fixedly secured in position by welding along the edge 15. As shown in Figs. 3 and 5, the cover portion may extend around the part 14 far enough and the fit may be so tight as to prevent outward displacement of the knuckle part. By welding along the edge 15, that is, at the juncture of the knuckle part 14 and the blank, these parts are integrally united.

In the form shown in Figs. 6-10 inclusive a groove 16 is cut in one face of the blank extending from one end inwardly to a point 17 coextensive with the length of the cover portion. As shown in Fig. 9 the groove is shallow and has angular end walls 18 adapted to take the end thrust from the pintle bearing knuckle part 19 which is to be inserted into the groove. The cover portion of the blank may be reduced in thickness or tapered substantially as shown. The face 20 which is tapered longitudinally may also be tapered from each edge of the groove outwardly as shown at the end of the blank, Fig. 6. When this end of the blank is formed or curled with the knuckle part 19 inserted in the groove 16, the dies used for this purpose will produce an inward displacement of the blank along its longitudinal edges, thus giving to the cover portion a crowned effect as shown in Fig. 9 and bringing the surface 20 into right angle relation with the ends of the part 19. Whether or not the blank is tapered as described, the knuckle part will be squeezed within the embracing wall of the cover portion. This knuckle part may, however, be pressed into the groove 16 after the curling operation and would be held in a press-fit in the groove and against the end thrust walls 18. The part 19 may be bored either before or after its assembly with the blank, and may also be welded in position. Said part 19 may be made of a better grade of steel and hardened to produce better bearing surfaces both for the pintle pin and the end thrust faces of the knuckle parts of the inside hinge member.

Figs. 11-14 inclusive show another form of the invention in which the pintle bearing knuckle part 21 is chamfered at its ends 22 and the blank 23 may be tapered and crowned substantially as shown in Fig. 12. The blank will be curled or otherwise shaped to provide a hood portion as above described, and the part 21 will be inserted in the hollow of the cover portion and then welded thereto along the line between the points 24 and 25, at both ends. As shown in Fig. 14, the weld at both ends of the part 21, indicated by 26, fills the space afforded by the chamfer of the ends of the bearing part. Said bearing part 21 is made slightly larger in diameter than the knuckle parts 27 of the inside hinge member so that clearance will be provided between the periphery of said knuckle parts 27 and the inner wall of the cover portion. In this form my invention contemplates the provision of suitable grooves between the parts 21 and 23 to receive the metal displaced by the welds.

In the form of the invention shown in Figs. 15-17, inclusive, the blank 28 is tapered longitudinally at one end and transversely at the sides 29 of this end approximately as shown in Fig. 6, except that the center portion 30 is left standing above the side portions, although it is tapered longitudinally for the purpose of giving the reduced thickness of the cover portion. In this form of the invention the cylindrical bearing part 31 is positioned on the surface 30 and welded thereto at 32, the region of contact. The blank will then be bent or formed around the bearing part 31 by suitable dies which engage both of these parts, thus forming a curved knuckle cover portion 33, as shown in Fig. 17, with the bearing part 31 secured in position in the hollow of the cover portion. In this form a clearance space 34 is provided between the inner walls 29 of the cover portion and the periphery of the knuckle parts of the inside hinge member, the latter of which are not shown but would be of the same diameter as the knuckle part 31. As shown in Fig. 17, the cover portion 33 is formed so as to position the knuckle part 31 offset to one side of the blank proper farther than in the previous forms. In practice, this greater offset is preferred since it allows greater clearance between the strap portions of the inside and outside hinge blanks.

In Fig. 18 I have shown still another form of the invention in which the pintle bearing knuckle part 35 is secured in position in the hollow of the cover portion 36 by means of a pin 37 which has a press-fit in a hole bored through the cover portion and the part 35 and terminating within the metal blank, as shown in dotted lines. In the example shown, the part 35 is bored at 38 for the pintle bearing at one side of the pin 37 so as not to interfere with the latter. In this form the dotted line 39 indicates the outside diameter of the knuckle part of the inner hinge member.

It is believed that the foregoing conveys a clear understanding of the principles of my invention and it will be apparent, in view of the different forms herein disclosed, that in practice the method may be performed in various ways within the contemplation of my invention.

I claim:

1. A hinge member comprising a metal blank curved at one end to provide a cover portion, said cover portion being grooved on its inner side, and a separate pintle bearing knuckle part located and held in said groove with its end walls abutting against the side walls of the groove.

2. A hinge member comprising a metal blank curved at one end to provide a cover portion, said cover portion being grooved on its inner side, and a separate pintle bearing knuckle part disposed in said groove with its end walls abutting the sides of the groove, said blanks before the curving of the end thereof being tapered transversely toward its side edges along opposite sides of said groove, and being arranged in the curving of the end thereof about the knuckle part, to have the longitudinal edges thereof inwardly displaced to give a crowned effect to the outside of the cover portion and throw the inside surfaces into a common plane, whereby to grip the knuckle part between the side walls of the grove, substantially as described.

In witness of the foregoing I affix my signature.

SETH B. ATWOOD.